United States Patent [19]

FitzGerald

[11] Patent Number: 5,167,440
[45] Date of Patent: Dec. 1, 1992

[54] WHEEL COVER MOUNTING FOR HEAVY VEHICLES

[75] Inventor: David J. FitzGerald, San Leandro, Calif.

[73] Assignee: Wheel Masters Inc., San Leandro, Calif.

[21] Appl. No.: 817,319

[22] Filed: Jan. 6, 1992

[51] Int. Cl.$^5$ .................................................. B60B 7/12
[52] U.S. Cl. ................... 301/37.1; 301/37.28; 301/37.35
[58] Field of Search ............. 301/37 R, 37 AT, 37 P, 301/37 TP, 37 PB, 37 S, 108 R, 37 H, 37 C, 37 CD

[56] References Cited

U.S. PATENT DOCUMENTS

| | | | |
|---|---|---|---|
| 1,836,424 | 12/1931 | Yanss | 301/108 R |
| 2,614,001 | 10/1952 | Rycroft | 301/37 R X |
| 2,629,636 | 2/1953 | Lyon | 301/37 R |
| 3,021,178 | 2/1962 | Thornton | 301/37 AT |
| 4,487,455 | 12/1984 | Nickoladze | 301/37 AT |
| 4,725,100 | 2/1988 | Patti | 301/37 H X |
| 5,064,249 | 11/1991 | Hung | 301/37 P |

*Primary Examiner*—Russell D. Stormer
*Attorney, Agent, or Firm*—Linval B. Castle

[57] ABSTRACT

Apparatus for firmly and quickly mounting an ornamental wheel cover on a bus or truck wheel having handholds and exposed lug nuts by applying a mounting ring that overlies the wheel and has a portion that fits through at least two handholds and can be rotated in a bayonet-type connection to grasp the wheel. A wheel cover with lug nut clearance holes then may be firmly secured with a quarter-turn fastener to the mounting ring which is locked against rotation by the wheel cover hole engagement with the lug nuts.

9 Claims, 5 Drawing Sheets

1

WHEEL COVER MOUNTING FOR HEAVY VEHICLES

BRIEF SUMMARY OF THE INVENTION

This invention relates to the mounting of ornamental wheel covers and particularly to apparatus for the very easy and rapid mounting of such a wheel cover on larger vehicles such as recreation vehicles, trucks and busses.

There are many different devices for mounting ornamental wheel covers to the wheels of trucks and busses. Some of the covers are attached under the lug nuts but most do not require removal or loosening of the lug nuts. For example Patent 4,240,670 to Zorn et al describes a wheel cover which is attached to the chamfered portion of the wheel lug nuts which remain intact in securing the wheel to the axle flange. An example of a wheel cover that does not rely on the wheel lug nuts is described in Dieterich patent No. 2,722,460 in which the wheel cover is centrally suspended from the wheel openings by adjustable length members hooked between the openings and the wheel cover.

In the design of wheel cover attachment systems, it is important that the mounting does not require the loosening or removal of wheel lug nuts or any cutting, drilling, or weakening in any way of any factory installed member or structure that may affect warranties or insurance protection. It is similarly important that the wheel cover provide unrestricted accessibility to the lug nuts and to the tire air stem.

Briefly described, the wheel cover attachment assembly of the invention includes a split ring secured together by a ring connector and having at least two diametrically opposite pins that engage hand holds in the vehicle to form a bayonet type coupling. The wheel cover having clearance holes for passing over the lug nuts is connected to the ring connector by a fastener while the lug nuts prevent rotation of the wheel cover and release of the bayonet type coupling and mounting ring.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
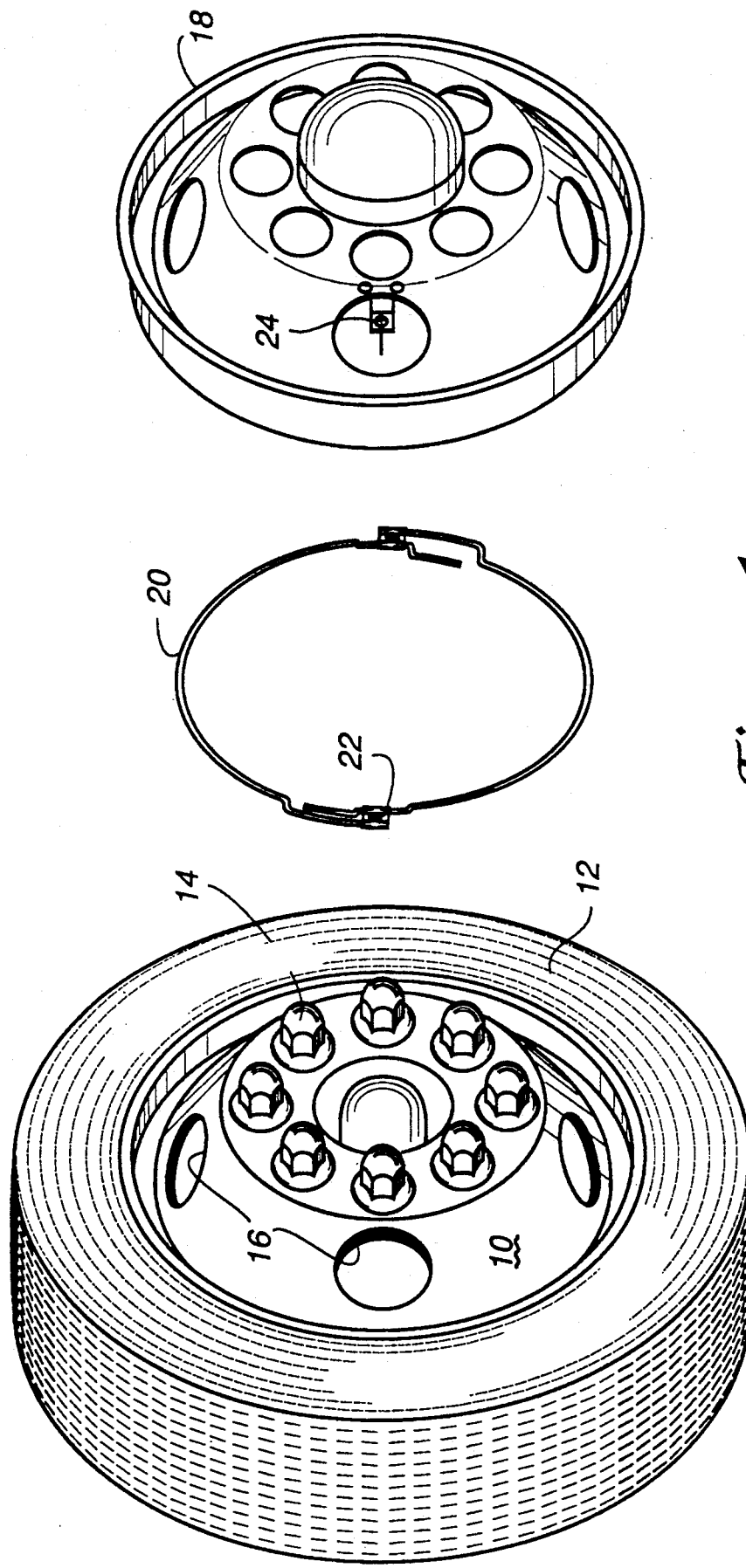
FIG. 1 is a perspective view of a front wheel of a heavy vehicle together with a wheel cover and split ring mounting.

Illustrated in FIG. 1 is a vehicle wheel 10 having a mounted tire 12 and a plurality of lug nuts 14 attaching the wheel to the hub of the vehicle. The wheel 10 has four hand holes 16 which provide access to the tire air stem and a convenient means for handling the wheel when there is a need for its removal from the vehicle.

For the firm attachment of an ornamental wheel cover 18 to the wheel 10 in accordance with the invention, a split ring 20 is first attached to the wheel. The split ring 20 is actually formed of two identical half-rings that are coupled together at the ends by ring connectors 22 shown in detail in FIG. 5. Each ring connector has a central rectangular hole into which is inserted a quarter turn fastener that also engages a hole in a retainer clip 24 riveted to the wheel cover 18, as illustrated in detail in FIG. 5.

Figure 2:
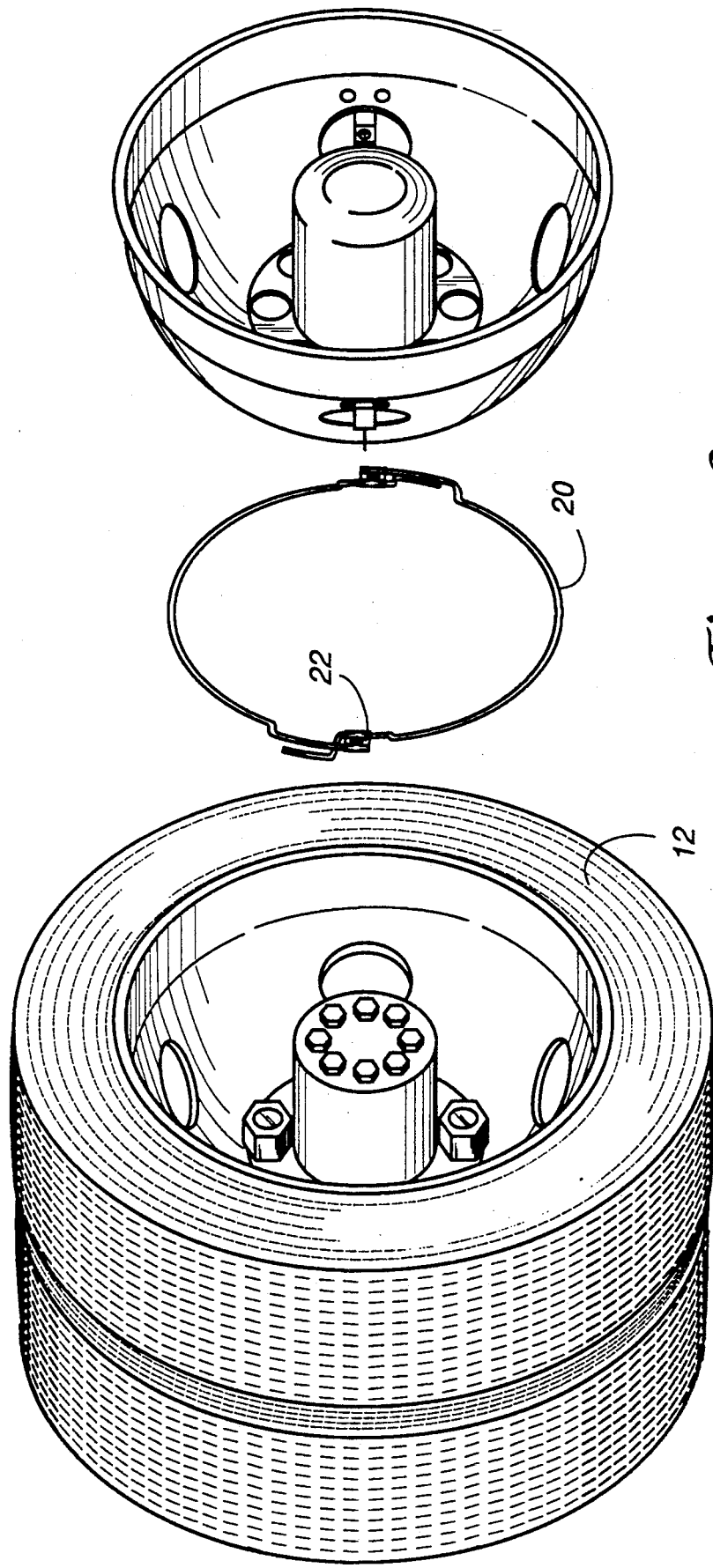
FIG. 2 is a perspective view of a read dual wheel of a heavy vehicle together with a wheel cover and split ring mounting.

FIG. 2 is a perspective view illustrating similar mounting apparatus used for attaching a wheel cover to dual rear wheels of a vehicle. Since the mounting apparatus is nearly identical in each instance, only the apparatus associated with a front wheel will be described in greater detail.

Figure 3:
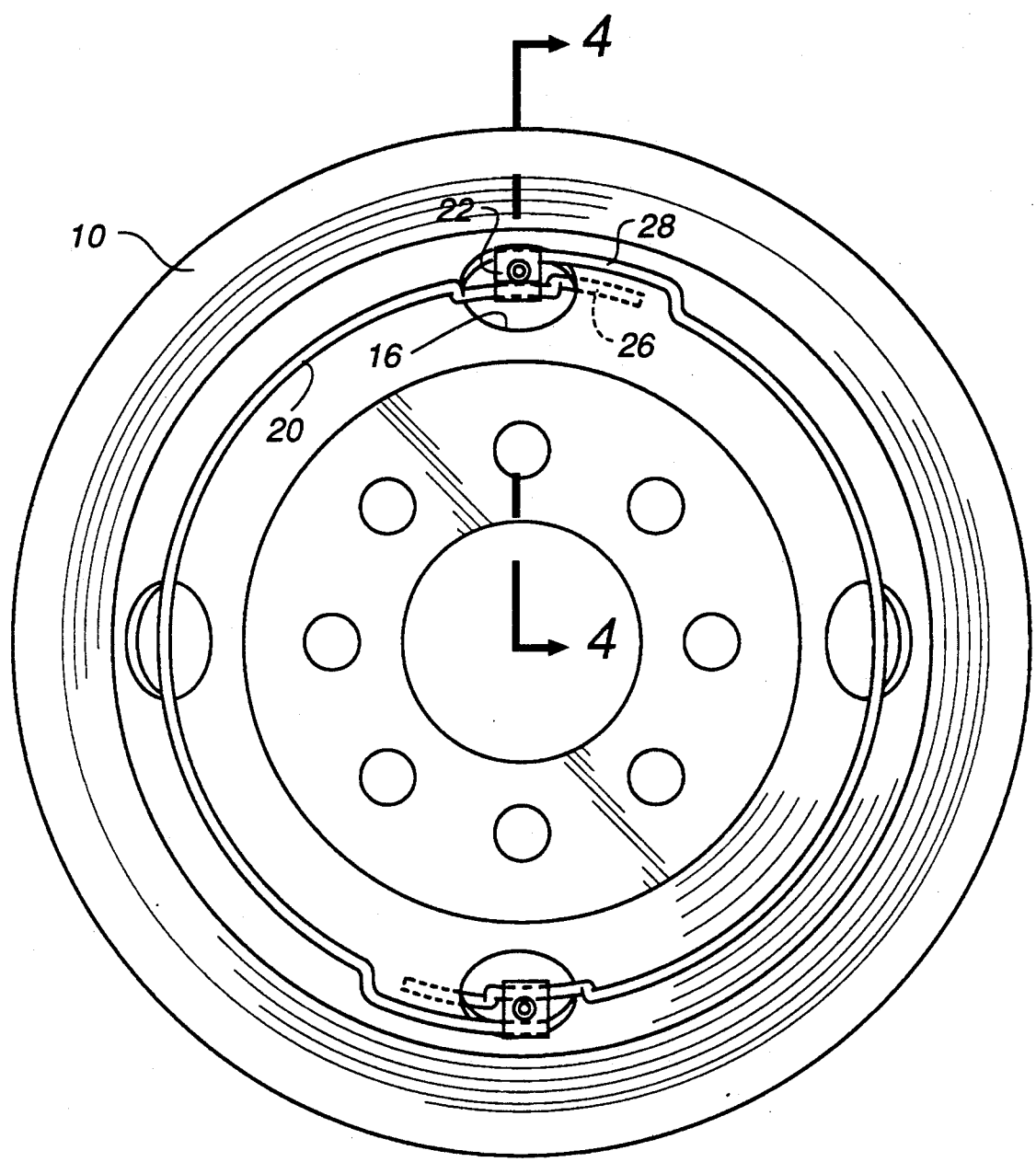
FIG. 3 is a view illustrating a split ring engaged on the front wheel of a vehicle.

FIG. 3 illustrates wheel 10 with the split ring 20 connected thereto prior to the attachment of the wheel cover 18. The split ring is comprised of two identical half-rings each about ⅜ inches in diameter and formed into a semicircle about one foot in diameter depending upon the size of the vehicle wheel. The ends of each half-ring are bent downward to the wheel handhold 16 so that end 26 is passed through the handhold and behind the metal of the wheel while the end 28 rests firmly against the outer surface of the metal of the wheel. The ends 26, 28 of both half-rings are firmly secured together with ring connectors 22 so the two connected half-rings form a complete circular ring that is firmly attached to the wheel by inserting the ends 26 into the handholds and then rotating a few degrees in the bayonet type connection.

The ring connectors 22 have a central hole for receiving a fastener attached to the wheel cover 18. This fastener may be a long self-tapping screw or preferably, for fast removal and installation, is a quarter-turn fastener to be described later in connection with FIG. 5.

Figure 4:
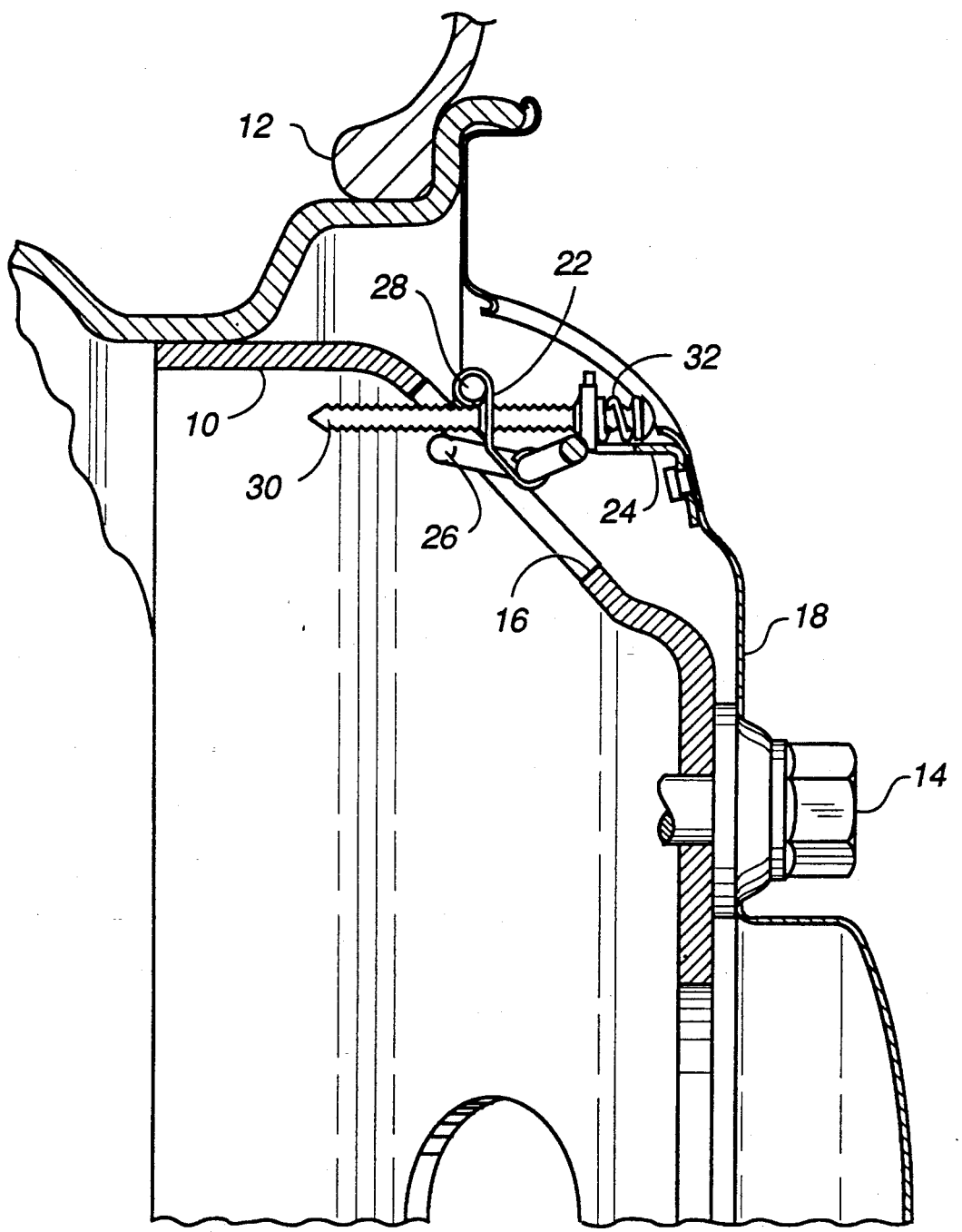
FIG. 4 is a sectional view taken along the lines 4—4 of FIG. 3.

FIG. 4 is a sectional view through a portion of the wheel of FIG. 3 and illustrates the mounting of wheel cover 18 on wheel 10. The mounting ring 20 has been installed with its end 26 through the handhold 16 and behind the metal of the wheel while the end 28 firmly overlies the outer surface, the ends being permanently secured together by the ring connector 22.

While the mounting split-ring 20 is being held in position by the clamping action of the ends 26 and 28, the wheel cover is applied to the wheel so that the lug openings in the wheel cover fit over the wheel lugs 14 and the center of the retainer clip 24 secured by rivets to the wheel cover is aligned with the hole in the ring connector 22. Then a fastener is used to interconnect the wheel cover with the mounted split-ring 20. As mentioned above, the fastener may be a long interconnecting screw or is preferably a quarter-turn fastener 30 with a strong compression spring 32 which would enable the user to force the fastener 30 in through the hole in the ring connector 22 and then lock it by turning a quarter turn. The wheel cover, now firmly attached to the split-ring 20 which is bayonet connected to a vehicle wheel 10 cannot be removed without removing the fasteners 30 because the wheel lugs 14 pass through the lug clearance holes in the wheel cover thus preventing all angular movement between the wheel and wheel cover.

Figure 5:
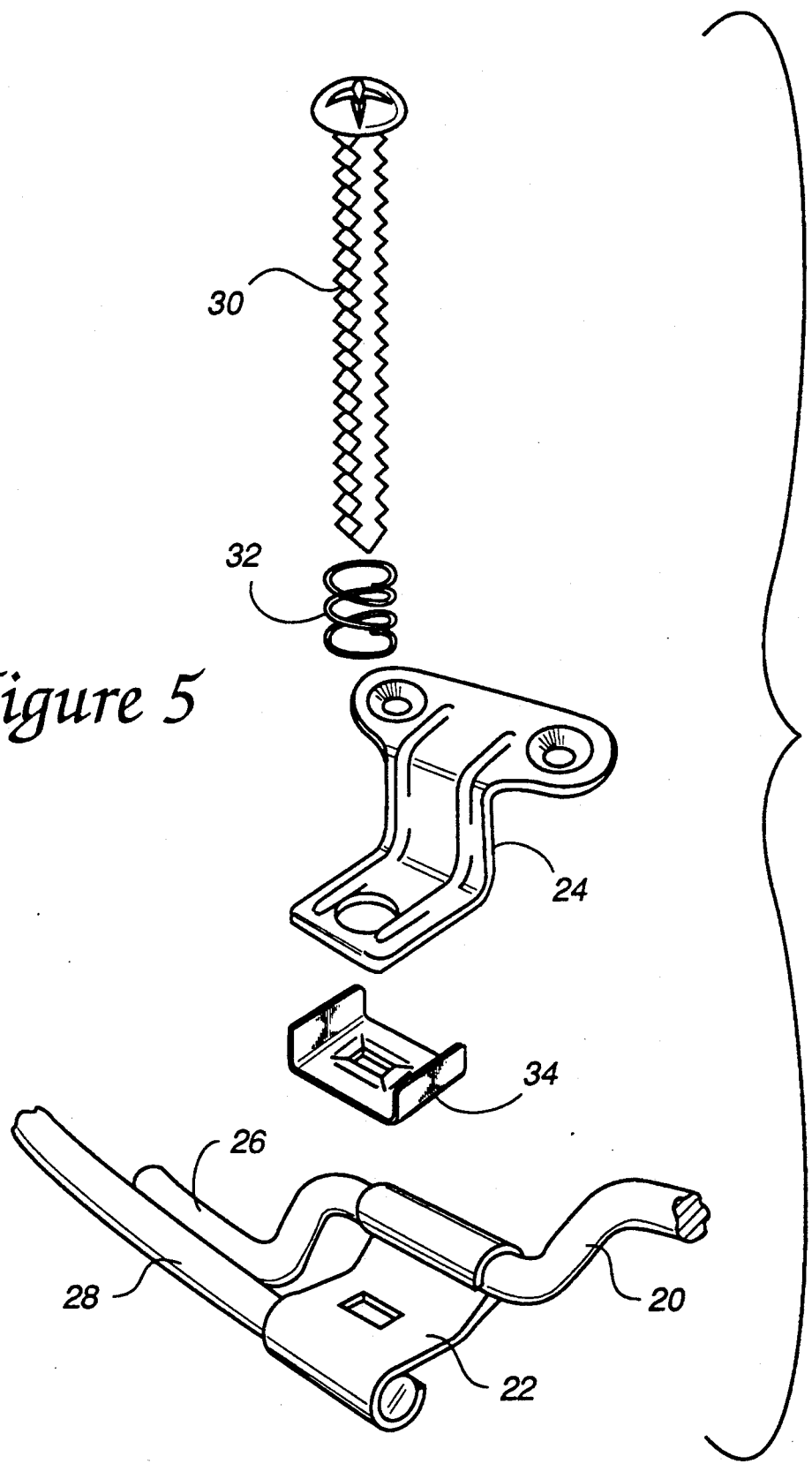
FIG. 5 is a detailed view of the attachment hardware used in the invention.

FIG. 5 illustrates in detail the various interconnecting components described in connection with FIG. 4. As previously described, the ring connector permanently couples the ends 26 and 28 of the split-ring 20 having a central hole which, for a quater-turn fastener 30, is rectangular to permit the passage of the fastener 30. The fastener, which has smooth flat sides and toothed or multislot edges for engaging the metal of the ring connector, is fitted with the compression spring 32 and is passed through a circular clearance hole in the retainer clip 24 firmly attached to a wheel cover. The fastener is then passed through an anti-rotation clip 34 which has a hole which fits the rectangular cross section of the fastener 30 but with a depending protrusion that acts as a stop to limit the rotation of the fastener to one quarter turn. The fastener 30 then enters the rectangular hole in the ring connector 22 and pressure is applied to the fastener head to compress the spring 32 while the fastener is rotated the quarter turn necessary for the edge grooves to engage the thin metal sides of the rectangular hole.

I claim:

1. Apparatus for mounting an ornamental wheel cover with wheel lug clearance holes on a vehicle wheel having a plurality of handholds and wheel lugs, said apparatus comprising:

a circular mounting ring overlying the exterior surface of the vehicle wheel and having members for entering at least two handholds in the wheel, rotation of said ring causing said members to lie against the rear surface of the vehicle wheel;

a ring connector coupled to said mounting ring; and means for fastening the wheel cover to said ring connector while the vehicle wheel lugs extend through said wheel cover lug clearance holes for preventing rotation of said wheel cover.

2. The apparatus claimed in claim 1 further including a retainer clip secured to said wheel cover, said retainer clip having means for cooperating with said ring connector fastening means for interconnecting said wheel cover and said mounting ring.

3. The apparatus claimed in claim 2 wherein said circular mounting includes a plurality of arcuate ring sectors connected together by a ring connector to form a circular mounting ring, a first end of each sector being bent to pass through a handhold and to lie against the rear surface of a vehicle wheel, the second end of each sector being bent being bent to lit against the front surface of a vehicle wheel, the rotation of the circular mounting ring forming a bayonet type lock of said ring to said wheel.

4. The apparatus claimed in claim 3 further including fastening means for removably attaching said wheel cover to said ring connector.

5. The apparatus claimed in claim 4 wherein said fastening means is a quarter-turn fastener.

6. A method for attaching an ornamental wheel cover to a vehicle wheel having a plurality of handholds and exposed wheel lug nuts, said method comprising the steps of:

attaching a substantially circular mounting ring to the exterior of the vehicle wheel, said mounting ring having first portions that enter at least two handholds and, upon small rotation of said ring, lie against the rear surface of the vehicle wheel and second portions that firmly lie against the front surface of the vehicle wheel, said mounting ring further having a ring connector for connecting a fastener;

applying a wheel cover over said vehicle wheel and said mounting ring, said wheel cover having clearance holes for passage of the wheel lug nuts; and connecting a removable fastener between between said wheel cover and said ring connector.

7. Apparatus for mounting an ornamental wheel cover on a vehicle wheel having a plurality of handholds and wheel lugs, said apparatus comprising:

a circular mounting ring overlying the exterior surface of the vehicle wheel and having members for entering at least two handholds in the wheel, rotation of said ring causing said members to lie against the rear surface of the vehicle wheel to lock said ring in a position adjacent said wheel; and fastening means for removably connecting said mounting ring to the wheel cover.

8. The apparatus claimed in claim 7 further including means for locking said mounting ring to prevent counterrotation of said ring.

9. The apparatus claimed in claim 8 wherein said locking means includes at least one wheel lug clearance hole in the wheel cover fastened to said mounting ring.

* * * * *